United States Patent
Ozawa et al.

[11] Patent Number: 6,152,620
[45] Date of Patent: Nov. 28, 2000

[54] PROCESSING METHOD FOR REWRITABLE CARD AND PROCESSING APPARATUS FOR THE SAME

[75] Inventors: Masamitsu Ozawa; Yoshikazu Nishizawa; Masanari Nakamura, all of Shizuoka, Japan

[73] Assignee: Star Micronics Co., Ltd., Shizuoka, Japan

[21] Appl. No.: 09/427,318

[22] Filed: Oct. 26, 1999

[30] Foreign Application Priority Data

Oct. 26, 1998 [JP] Japan ................................. 10-303777

[51] Int. Cl.⁷ ............................... B41J 2/315; B41J 15/10
[52] U.S. Cl. .................... 400/120.01; 347/179; 347/187; 347/212; 101/483
[58] Field of Search ....................... 400/120.01; 347/179, 347/184, 186, 187, 218, 212; 101/483, 488; 430/19; 346/135.1; 503/201

[56] References Cited

U.S. PATENT DOCUMENTS

| 5,231,505 | 7/1993 | Watanabe et al. | 347/179 |
|---|---|---|---|
| 5,424,764 | 6/1995 | Yamaguchi et al. | 347/179 |
| 5,436,643 | 7/1995 | Yamaguchi et al. | 347/179 |
| 5,453,765 | 9/1995 | Yamaguchi et al. | 347/179 |
| 5,538,822 | 7/1996 | Hotta et al. | 347/179 |
| 5,634,319 | 6/1997 | Hotta et al. | 347/179 |
| 5,786,838 | 7/1998 | Steinhauser et al. | 347/179 |

FOREIGN PATENT DOCUMENTS

| 403160067A | 7/1991 | Japan | 347/179 |
|---|---|---|---|
| 405032007A | 2/1993 | Japan | 347/179 |
| 405301368A | 11/1993 | Japan | 347/179 |
| 5-33401 | 12/1993 | Japan . | |
| 406047990A | 2/1994 | Japan | 347/179 |
| 406055809A | 3/1994 | Japan | 347/179 |
| 406091987A | 4/1994 | Japan | 347/179 |

OTHER PUBLICATIONS

RICOH Termo–Chromic Film, Technical Report, RICOH Co., Ltd., (1998).

Primary Examiner—Eugene Eickholt
Attorney, Agent, or Firm—Scully, Scott, Murphy & Presser

[57] ABSTRACT

Disclosed is a processing apparatus for a rewritable card having a printing layer made of a heat-reversible recording material on which erasing/printing processes of images are repeatedly performed while traveling the card in a processing direction. The apparatus comprises an erasing/printing device for performing erasing/printing processes with respect to the printing layer; a heating device for performing heating process with respect to the printing layer; a temperature measuring device for measuring at least one of the temperature of the rewritable card and the ambient temperature in erasing/printing processes; and a control device for controlling the erasing/printing processes by the erasing/printing device and the heating process by the heating device according to the temperature measured by the temperature measuring device. The control device controls the erasing device to perform only one erasing process when the measured temperature is a reference temperature or more, and controls the heating device to perform the heating process prior to the erasing process when the measured temperature is lower than the reference temperature.

8 Claims, 15 Drawing Sheets

PROCESSING METHOD FOR REWRITABLE CARD AND PROCESSING APPARATUS FOR THE SAME

BACKGROUND OF THE INVENTION

The present invention relates to a processing method and to an apparatus for a rewritable card having a printing layer in which images such as characters and patterns can be printed by predetermined heating/cooling processes, and more specifically relates to a technology for improving erasing properties of images.

Recently, various kinds of magnetic cards are used for many purposes. Among these, there are types of cards on which changing information is updated and indicated on the card every time the card is used. As examples of such cards, prepaid cards such as telephone cards and train cards on which the balance is indicated, point cards in which points are added according to a purchase amount, and consultation appointment for dental clinics cards in which the next consultation day and time are indicate and the like may be mentioned. In the past, images of changing information were generally written on cards by a printer of the dot impact-type or the thermal-type. In these types of printing, however, all the printed images were remained and the history thereof was indicated, and therefore, it was necessary to make the images small or to enlarge the printing area to obtain the necessary number of printing lines. Therefore, there were problems in that printed images were not easy to read and the area for indicating permanent images such as patterns and names in addition to the variable information was narrow.

Recently, rewritable cards in which previous images are erased and only the newest images are printed at the same position as the previous images are available. Such a rewritable card is manufactured of a resin substrate and a rewritable layer which is made of a heat-reversible recording material and which is laminated on the substrate. A thermal head unit of a card processing apparatus performs heating/cooling processes on the rewritable layer according to the characteristics thereof so as to repeatedly perform erasing/printing, in other words, so as to rewrite images. The card processing apparatus is generally constructed to thrust erasing and printing heads heated to a printing layer of a card, thereby performing erasing/printing processes, while traveling the card which is clamped between the erasing head and a platen roller, and is subsequently clamped between the printing head and a platen roller.

In accordance with the inventors' research, the heat-reversible recording material has a property in which the temperature range for reaching the erasing condition (temperature at initiation of printing to temperature at initiation of erasing) changes according to the ambient temperature, in other words, the temperature of the card. In particular, it has been known that the temperature range becomes remarkably narrow when the ambient temperature is relatively low, for example, when it is lower than 15° C. The reason for this is believed to be that at low temperatures, the difference between the temperature of the card and the temperature of the erasing head is large, and therefore the temperature gradient along the depth of the card in the conduction of heat from the erasing head to the printing layer is large, and that the card becomes hard, so that contact between the erasing head and the card is reduced. Therefore, erasing errors easily occur when the temperature is low, and the erasing properties are thereby degraded.

Resin substrates forming base elements of rewritable cards are formed of various materials such as PET (polyethylene terephthalate), which is flexible, and PVC (polyvinyl chloride) on which embossing is preferably performed, and these resins have differing hardnesses. In general, a printing layer is integrally formed by pressing a substrate. The surface of such a card has a form in which the center thereof in the width direction projects slightly. As a result, contacting properties of the erasing head with respect to the entire surface of the printing layer are degraded, so that images at both sides of the printing layer cannot be erased. The contacting properties are substantially degraded at low temperatures and in hardened cards, so that the entire width of the printing layer cannot be available, and the printing area is necessarily reduced.

SUMMARY OF THE INVENTION

An object of the invention is to provide a processing method and an apparatus for processing a rewritable card, which can improve erasing characteristics and enlarge the printing area at low temperatures.

The invention provides a processing method for a rewritable card having a printing layer made of a heat-reversible recording material on which erasing/printing processes of images are repeatedly performed while traveling the rewritable card in a processing direction. The method comprises: erasing images printed on the printing layer by an erasing head; and printing images on the printing layer by a printing head. Heating is performed with respect to the printing layer prior to the erasing.

According to the invention, the printing layer is heated prior to the erasing process, so that the difference between the temperature of the erasing device and that of the printing layer is small, and the temperature of the entire surface of the printing layer rapidly increases to an erasing temperature. Therefore, even if the temperature is low or the contacting properties between the erasing device and the printing layer are insufficient, images are securely erased. Moreover, flexibility of the card is increased by the first heating, so that the contacting properties between the erasing device and the printing layer are improved, and the erasing characteristics can thereby be improved. Thus, the invention allows erasing over the entire surface of the printing layer and enlarging of the effective area of the printing area.

The above method includes the heating process prior to the erasing process. However, because erasing errors usually occur only at low temperatures, the heating process prior to the erasing process is preferably performed only when the card temperature is low in order to conserve energy and shorten the processing time. Therefore, according to another aspect of the invention, at least one of the temperature of the rewritable card and the ambient temperature is measured, and heating of the printing layer is performed prior to the erasing process only when the measured temperature is lower than a reference temperature. The "reference temperature" refers to a temperature below which images are not completely erased by the erasing process. The reference temperature, which varies according to the material of the rewritable card, is approximately in the range of 5 to 25° C.

The invention provides a processing apparatus for a rewritable card, which is suitable for use with the above method.

That is, the invention provides a processing apparatus for a rewritable card having a printing layer made of a heat-reversible recording material on which erasing/printing processes for images are repeatedly performed by erasing images printed on the printing layer, and printing images on the printing layer while traveling the rewritable card. The apparatus comprises: an erasing/printing device for performing erasing/printing processes with respect to the printing layer; a heating device for performing heating process with respect to the printing layer; and a control device for controlling the erasing/printing processes by the erasing/printing device and the heating process by the heating device. The control device controls the heating device to perform the heating process with respect to the printing layer prior to the erasing process.

In another aspect of the invention, a heating process is performed prior to an erasing process only at low temperatures. The processing apparatus according to the above apparatus comprises a temperature measuring device for measuring at least one of the temperature of the rewritable card and the ambient temperature; and a control device for controlling the erasing/printing processes by the erasing/printing device and the heating process by the heating device according to the temperature measured by the temperature measuring device. The control device controls the erasing device to perform a single erasing process when the measured temperature is at or above a reference temperature, and controls the heating device to perform the heating process prior to the erasing process when the measured temperature is below the reference temperature. The reference temperature is approximately in the range of 5 to 25° C. as well as the above method.

More specifically, the erasing/printing device may comprise an erasing head for performing the erasing process and a printing head for performing the printing process. The erasing head may serves as the heating device.

The control device may firstly control the erasing head to perform the heating process while traveling the rewritable card in the processing direction; secondly, travel the rewritable card in the opposite direction after completing the heating process; thirdly, control the printing head to perform the printing process while traveling the rewritable card in the processing direction.

DETAILED DESCRIPTION OF THE INVENTION

Figure 1:
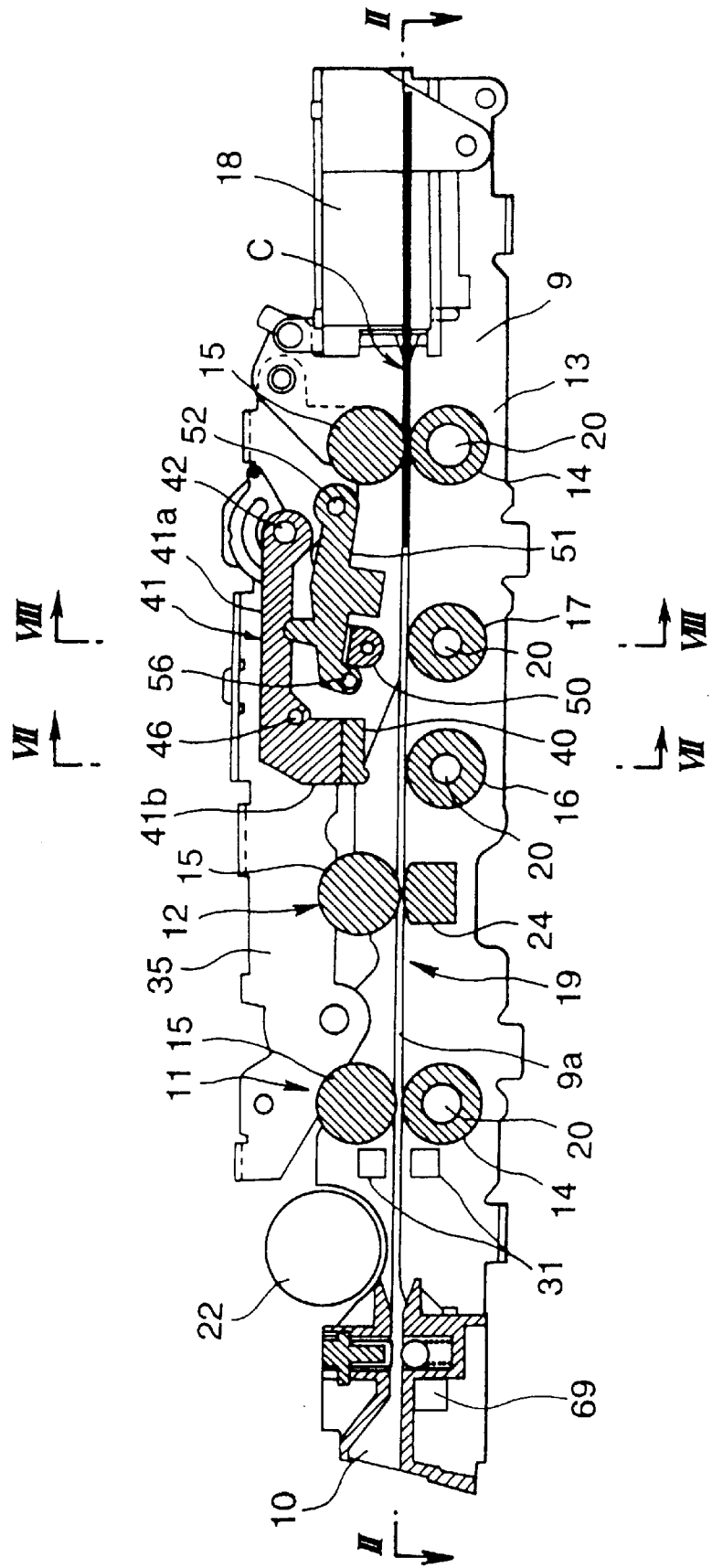
FIG. 1 is a right side sectional view of the card processing apparatus according to an embodiment of the invention.
Figure 2:
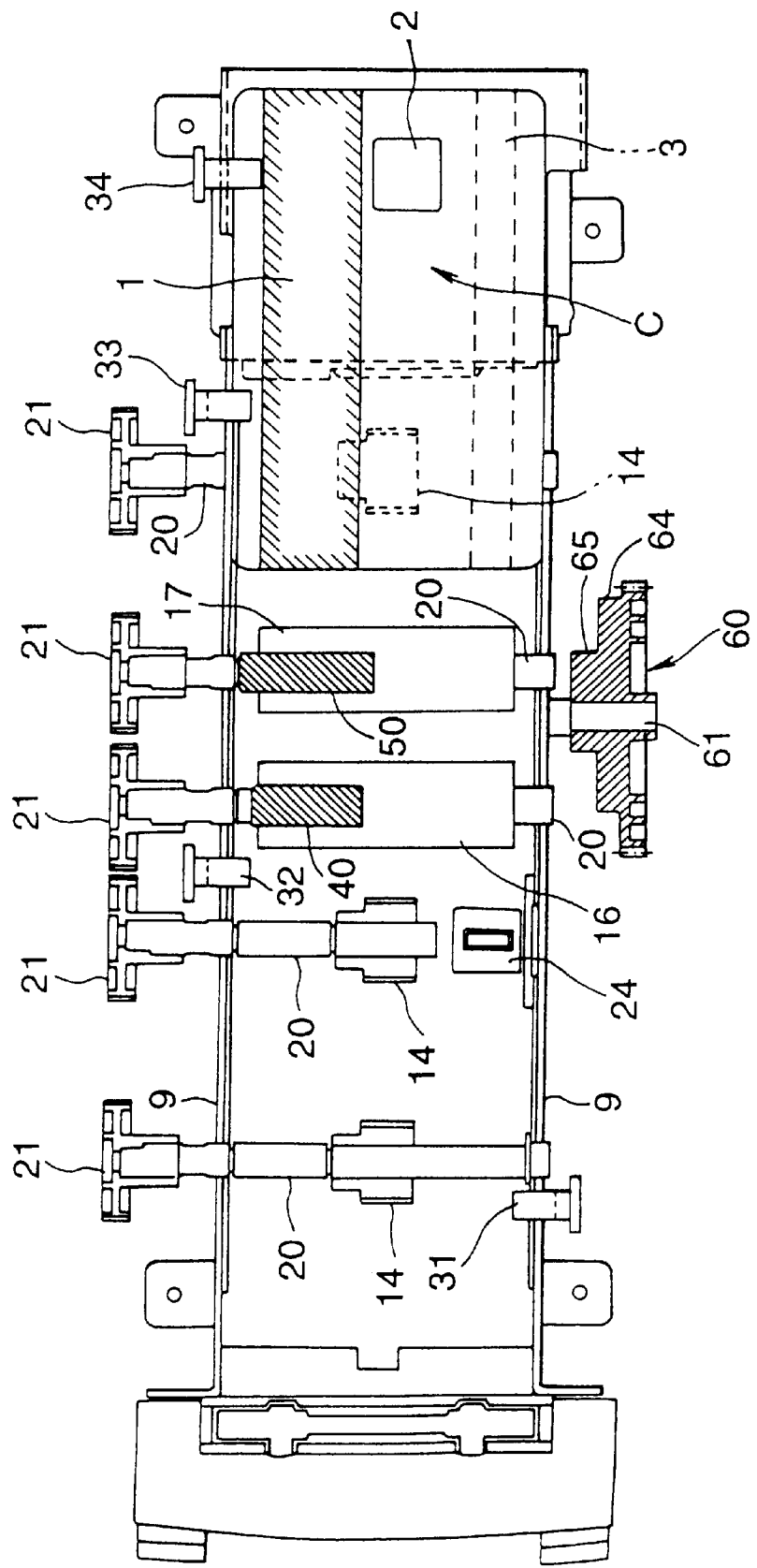
FIG. 2 is a view taken along line II—II of FIG. 1.

Embodiments of the invention will be explained with reference to the drawings. FIG. 1 is a right sectional view of a card processing apparatus used by a card processing system of the embodiment, and FIG. 2 is a view taken along line II—II of FIG. 1. The left side in the figures is the front side of the unit, the right side in the figures is the rear side of the unit, the upper side in FIG. 2 is the left side of the unit, and the lower side in FIG. 2 is the right side of the unit. In the following descriptions, the front, back, left, and right directions are defined as directions based on such a card processing apparatus. As shown in FIG. 1, when a rewritable card C (hereinafter referred to simply as a "card") is inserted into an insertion opening 10 provided at the front end of the card processing apparatus, the card C is traveled to the standby position at the rear end of the unit. When a predetermined processing command is issued under these conditions, the card C is traveled to the front, and erasing and printing are performed, in that order, on a rewritable layer disposed at the surface of the card C. First, details of the card C will be explained before explanation of the construction of the card processing apparatus.

(1) Construction of Rewritable Card

The card C is a rectangular IC card, for example, according to "Japanese Industrial Standard No. 6303". As shown in FIG. 2, the card C comprises a substrate made of a resin such as PVC (polyvinyl chloride). A rewritable layer 1, made of a heat-reversible recording material, is laminated on the substrate. External terminals 2 of an IC chip are provided on the surface of the substrate. A magnetic strip 3 is provided on the reverse surface of the substrate. Rewritable layer 1 is laminated in a strip at the upper side of the card C over the entire length of the card C in FIG. 2. The external terminals 2 are disposed below the rewritable layer 1 and are at a given position at the right side of the card C. The magnetic strip 3 on the reverse surface is laminated at the under side of the card C.

Figure 4:
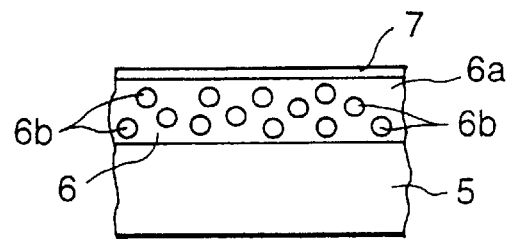
FIG. 4 is a schematic view showing a heat-reversible recording material which forms a printing layer of a rewritable card according to an embodiment of the invention.
Figure 5:
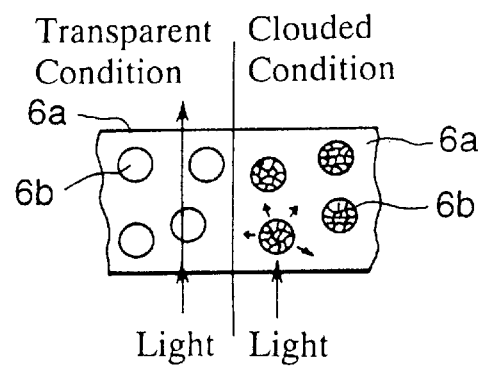
FIG. 5 shows the function of the heat-reversible recording material.

The heat-reversible recording material forming rewritable layer 1 is reversible by heating, and the recording material is easily capable of being repeatedly erased/printed on, in other words, of being rewritten on. As shown in FIG. 4, the heat-reversible recording material is manufactured so that a recording layer 6 in which an organic low-molecular substance 6b is dispersed in a resin 6a, and a protective layer 7, are laminated on a transparent polyester film 5, in that order. A higher fatty acid having a particle size of 1 μm or less is used for the organic low-molecular substance 6b. The function of the reversibility is explained with reference to FIG. 5. In the transparent condition, the particles in the organic low-molecular substance 6b in the recording layer 6 form relatively large single crystals. Therefore, there are a few frequencies at which incident light passes through the crystal interfaces, so that incident light is transmitted without scattering, and hence the recording layer 6 appears to be transparent overall. In the clouded condition, the particles in the organic low-molecular substance 6b form polycrystals. Therefore, incident light is refracted many times at the crystal interface, so that the light is scattered, and the recording layer 6 can be seen as being white.

Figure 6:
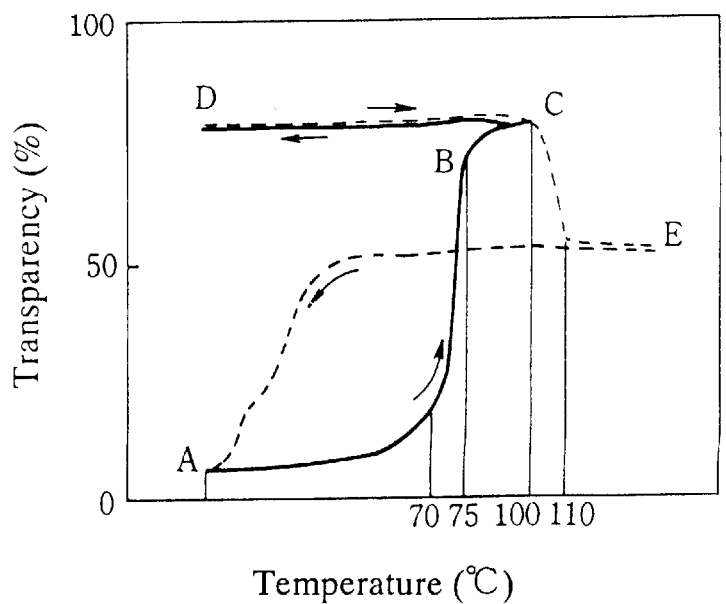
FIG. 6 is a chart showing transparent/clouded changes according to heating of the heat-reversible recording material.

Heat-reversible characteristics of the heat-reversible recording material are explained with reference to FIG. 6. At first, the heat-reversible recording material is in the clouded condition (A) at room temperature (20 to 30° C.). When the recording material is heated, the transparency begins to increase from about 70° C., as shown by the continuous line, and the condition becomes most transparent (B to C) at about 75 to 100° C. The transparent condition is maintained, even if the recording material is cooled to room temperature (D). Then, as shown by the broken line, the material in the most transparent condition is heated again to 110° C. or more, thereby changing to an intermediate condition between the most transparent condition and the most clouded condition (D to C to E). When the material is cooled to room temperature, it returns to the original clouded condition (E to A).

(2) Construction of Card Processing Apparatus

The construction of the card processing apparatus will be explained hereinafter. Numerals 9 in FIG. 1 to FIG. 3 indicate a pair of right and left lower side frames facing parallel to each other in a spaced condition. As shown in the figures, a pair of first travel rollers 11, a pair of second travel rollers 12 and a pair of third travel rollers 13 are disposed, in that order, from the front along the center of the lower side frames 9 and 9. Each pair of travel rollers 11, 12, and 13 consists of a lower driving roller 14 and an upper following roller 15 so as to clamp the card C and travel it from the front to the rear, or from the rear to the front, according to the rotation of the driving roller 14. A printing platen roller 16 and an erasing platen roller 17 are disposed, in that order, from the front between the second pair of travel rollers 12 and the third pair of travel rollers 13. A printing head (printing device) 40 is disposed above the printing platen roller 16. An erasing head (erasing device or heating device) 50 is disposed above the erasing platen roller 17.

As shown in FIG. 1, an IC unit 18 is disposed at the rear end between the lower side frames 9 and 9. The IC unit 18 contacts the external terminals 2 of the IC chip of the card C so as to perform input/output with respect to the IC chip 2. A travel path 19 is formed between an insertion opening 10 for the card C and the IC unit 18. The travel path 19 horizontally connects the clearances of the upper and lower rollers 14 and 15 of the first through third pairs of rollers 11, 12 and 13, the clearance of the printing platen roller 16 and the printing head 40, and the clearance of the erasing platen roller 17 and the erasing head 50. A groove-shaped card guide 9a is provided at the inner surface of the lower side frame 9 so as to smoothly travel the card C along the travel path 19. As mentioned above, the card C is first traveled to the standby position at the rear end of the unit when the card C is inserted into the insertion opening 10. The standby position is inside the IC unit 18.

Figure 3:
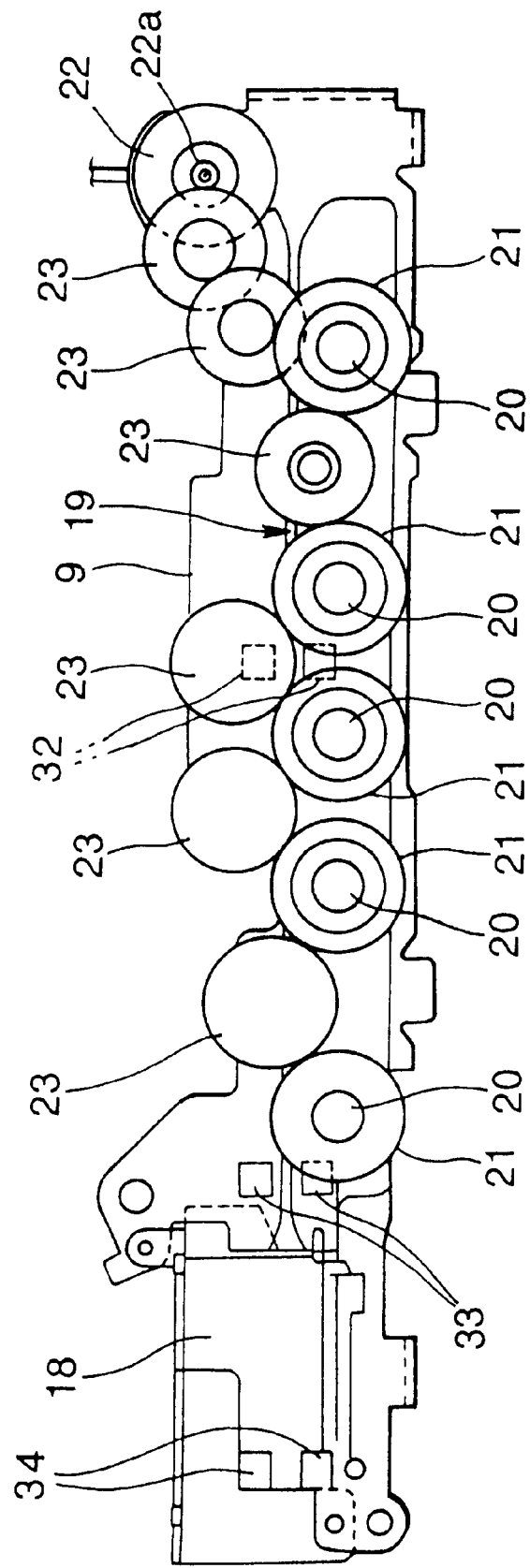
FIG. 3 is a left side view of the card processing apparatus according to an embodiment of the invention.

As shown in FIGS. 1 and 2, each driving roller 14 of the first through the third pairs of rollers 11, 12, and 13 and each platen roller 16 and 17 synchronously rotates with driving shafts 20 rotatably supported by the lower side frames 9 and 9. Each driving shaft 20 penetrates the left lower side frame 9, and the projected end thereof from the lower side frame 9 is attached to a driving gear 21. A main motor 22 is mounted at the rear end portion of the lower side frames 9 and 9 and at a slightly forwarded side of the insertion opening 10. As shown in FIG. 3, plural intermediate gears 23 are arranged at the left side of the left lower side frame 9. The intermediate gears 23 connect the driving gears 21 and a pinion 22a of the main motor 22. When the main motor 22 rotates, the rotation force thereof is transmitted to the driving gear 21 via intermediate gears 23 so as to rotate the driving shaft 20 in the same direction, whereby the driving rollers 14 of the first through the third pairs of rollers 11, 12 and 13 and the platen rollers 16 and 17 rotate. The card C is traveled along the travel path 19 according to the direction of rotation of the driving rollers 14 and the platen rollers 16 and 17. As shown in FIG. 2, a magnetic head 24 for performing reading/writing of data on the magnetic strip 3 of the card C is disposed at the right side of the driving roller 14 of the second pair of rollers 12.

As shown in FIG. 2, first through fourth card sensors 31, 32, 33, and 34 for detecting the card C traveled are provided, in that order, from the front. The first card sensor 31 is mounted at the front end of the right lower side frame 9. The second through the fourth card sensor 32, 33, and 34 are mounted to the left lower side frame 9.

Figure 7:
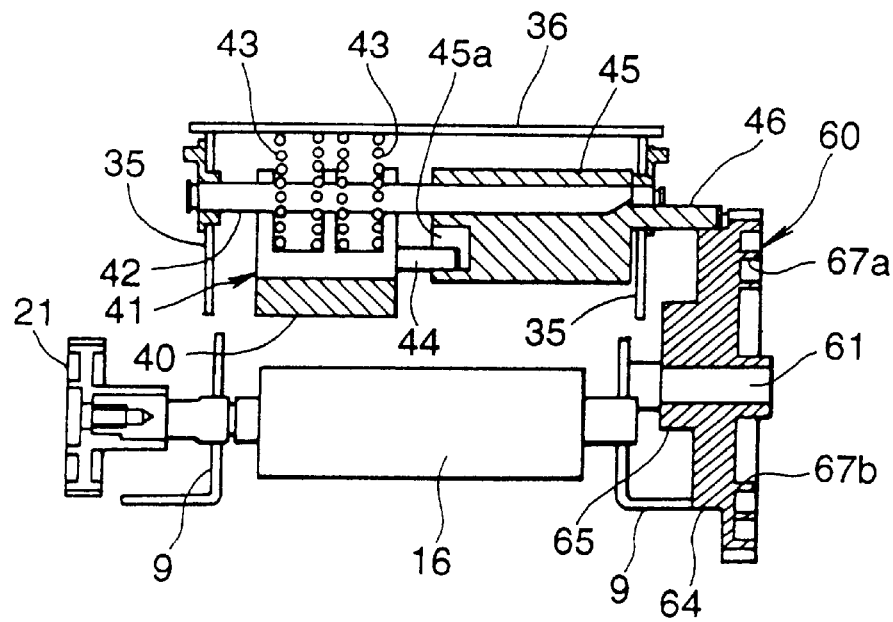
FIG. 7 is a view taken along line VII—VII of FIG. 1.

As shown in FIG. 1 and FIG. 7, a pair of right and left upper side frames 35 and 35 is attached to the lower side frames 9 and 9. The rear ends of the upper side frames 35 are hinged to the lower side frames 9. Therefore, the upper side frames 35 swing up and down so as to coincidentally open and close. Arms 41 and 51 extending toward the front are hinged to the upper side frames 35 and 35 so as to swing. As shown in FIG. 1, the printing head 40 is attached to the arm 41, and the erasing head 50 is attached to the arm 51.

As shown in FIG. 1, the arm 41 for the printing head 40 has an L-shaped configuration in side view, in which a long portion 41a extends toward the front and a short portion 41b extends downward from the front end of the long portion 41a. The rear end of the long portion 41a is supported at the left side of a swing shaft 42 which is supported by the upper side frames 35 and 35. The printing head 40 is attached to the lower surface of the short portion 41b which is a swinging end. As shown in FIG. 7, a top panel 36 is disposed above the printing head 40 and the erasing head 50. The top panel 36 is secured to the upper side frames 35 and 35. A pair of right and left compression springs 43 is disposed between the top panel 36 and the swinging end of the arm 41. The printing head 40 is usually biased downward by the compression springs 43 via the arm 41. As shown in FIG. 1 and FIG. 7, in the vicinity of the inner corner defined by the long portion 41a and the short portion 41b, a pin 44 projects from the right side surface of the arm 41. A sub-arm 45 forwardly extending parallel to the arm 41 is disposed at the right side of the arm 41. The sub-arm 45 is supported by the swing shaft 42 so as to swing around the shaft 42 as well as the arm 41. A recess 45a is formed at the arm 41 side of the front end of the sub-arm 45. The pin 44 engages with the recess 45a, so that the sub-arm 45 swings approximately coincidently with the arm 41. A cam pin 46 coaxial with the pin 44 projects from the right side surface of the front end of the sub-arm 45.

As shown in FIG. 1, the arm 51 for the erasing head 50 is disposed below the arm 41 for the printing head 40. A swing shaft 52 is supported by the side frames 35 and 35, and the rear end of the arm 51 is supported by the left end of the shaft 52, whereby the arm 51 swings around the shaft 52. The shaft 52 is located below the shaft 42 for the printing head 52 and is slightly rearward thereof. The arm 51 extends in the vicinity of the inner corner of the arm 41 for the printing head 40. The erasing head 50 is mounted on the lower surface of the front end of the arm 51. As shown in FIG. 7, a pair of right and left compression springs 53 is disposed between the top panel 36 and the swinging end of the arm 51. The erasing head 50 is usually biased downward by the compression springs 53 via the arm 41 as well as the printing head 40. A pin 54 projects in front of the erasing head 50 from the right side surface of the arm 51. A sub-arm 55 forwardly extends approximately parallel to the arm 51 in the right side of the arm 51. The rear end of the sub-arm 55 is supported by the swing shaft 52 so as to swing around the shaft 52 as well as the arm 51. A recess 55a is formed at the arm 51 side of the front end of the sub-arm 55. The pin 54 engages with the recess 55a, so that the sub-arm 55 swings approximately coincidently with the arm 51. A cam pin 56 coaxial with the pin 54 projects from the right side surface of the front end of the sub-arm 55.

Figure 8:
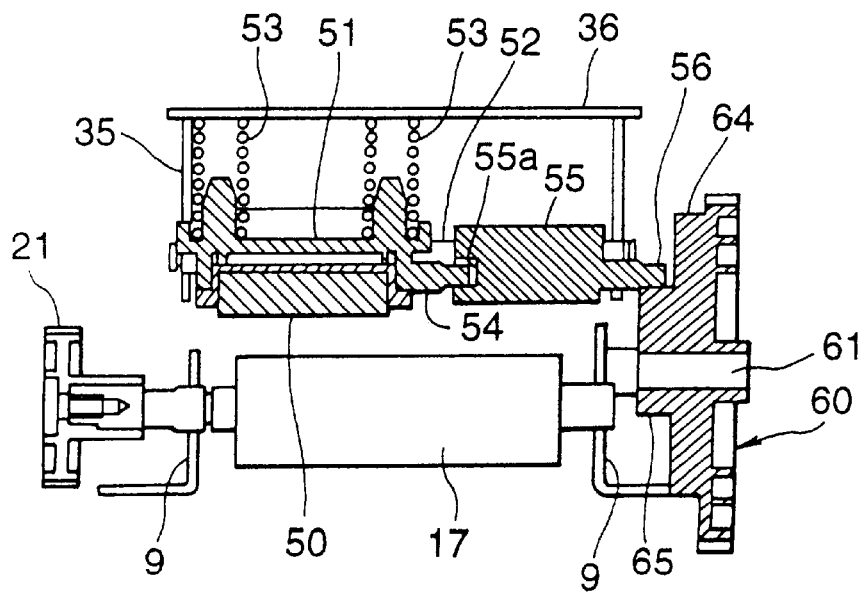
FIG. 8 is a view taken along line VIII—VIII of FIG. 1.

As shown in FIG. 2, FIG. 7, and FIG. 8, a cam gear 60 is disposed at the outer side (the right side) of the right lower side frame 9. The cam gear 60 swings the printing head 40 and the erasing head 50 so as to contact and separate from the traveled card C. The cam gear 60 is rotatably supported by the right lower side frame 9 via a shaft 61, and rotates by a cam motor (not shown) in the counterclockwise direction when viewed from the right side. The cam gear 60 is formed with a cam 64 for swinging the printing head 40 and a cam 65 for swinging the erasing head 50 coaxially formed in predetermined profiles. As shown in FIG. 7, the cam pin 46 for the sub-arm 45, which is biased downward coincidently with the printing head 40, usually contacts the upper surface of the cam 64 for the printing head 40 in a sliding connection. As shown in FIG. 8, the cam pin 56 for the sub-arm 55, which is biased downward coincidently with the erasing head 50, usually contacts the upper surface of the cam 65 for the erasing head 50 in a sliding connection.

The contact and separating condition of the erasing head 40 and the printing head 50 with respect to the card C is established according to the rotation angle of the cam gear 60. As shown in FIG. 9a to FIG. 9d, two cam sensors 66a and 66b which are located on the outer side (the side in the figures proximate to the viewer) of the cam gear 60 control the rotation angle of the cam gear 60. The cam sensor 66a and 66b detect circular ribs 67a and 67b formed on the outer surface of the cam gear 60 coaxially with the cam gear 60. The sensing signal of the cam sensor 66a and 66b is output to the cam motor. The output of the cam sensor 66a, 66b is input in a CPU 70. The CPU 70 controls the rotation of the cam gear 60 according to the signal pattern such that the cam gear 60 stops at four positions: a standby position, an erasing position, an erasing/printing position and a printing position, in that order.

The four positions will be explained with reference to FIG. 9A to FIG. 9D assuming that the card C is on each platen roller 16 and 17.

Figure 9A:
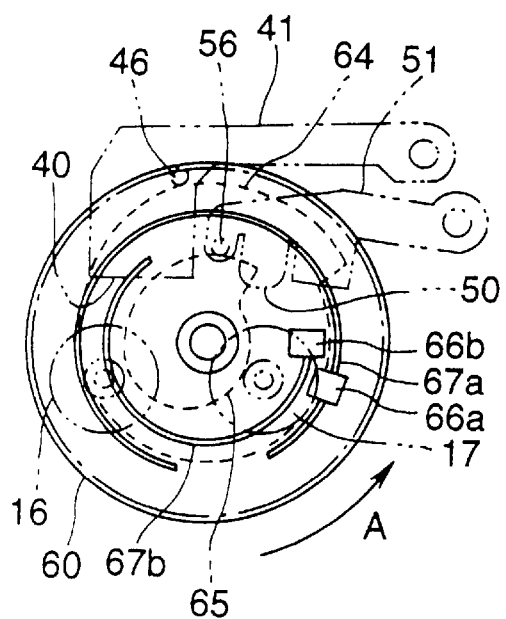
FIGS. 9A through 9D are side views showing positions of an erasing head and a printing head according to rotation angles of a cam gear, wherein FIG. 9A corresponds to a standby position, FIG. 9B corresponds to an erasing position, FIG. 9C corresponds to an erasing/printing position, and FIG. 9D corresponds to a printing position.

When the cam gear is at the standby position, as shown in FIG. 9A, the cam 64 for the erasing head and the cam 65 for the printing head thrust up the sub-arms 45 and 55 and the arms 41 and 51 via cam pins 46 and 56, so that the printing head 40 and the erasing head 50 are at a position apart from the card C. FIG. 7 and FIG. 8 show the condition in which the printing head 40 and the erasing head 50 are apart from the card C.

Figure 9B:
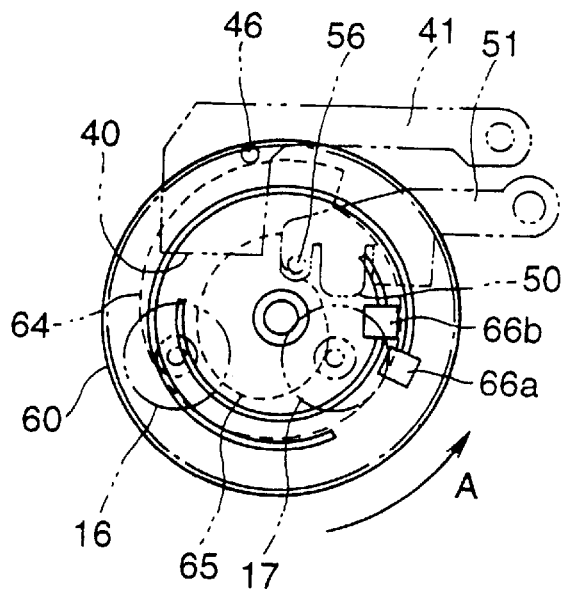
Figure 11:
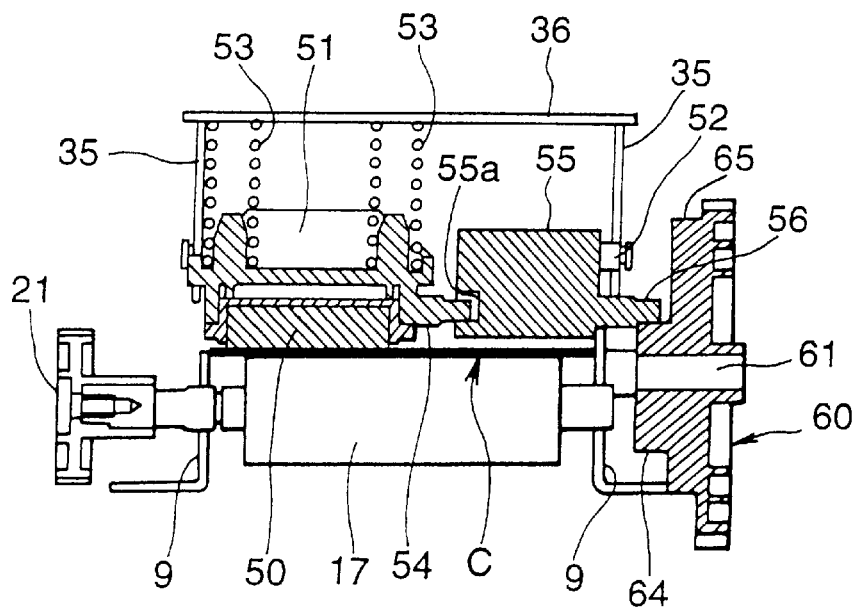
FIG. 11 is a view taken along line XI—XI of FIG. 16.

When the cam gear 60 rotates to the direction taken at the arrow A from the above condition, as shown in FIG. 9B, the cam pin 56 of the sub-arm 55 for the erasing head 50 slips out the top end of the cam 65 for the erasing head, so that only the erasing head 50 swings downward via arm 51 by the force of the compressing spring 53 and thrusts the card C. FIG. 11 shows the condition in which the erasing head 50 thrusts the card C.

Figure 9C:
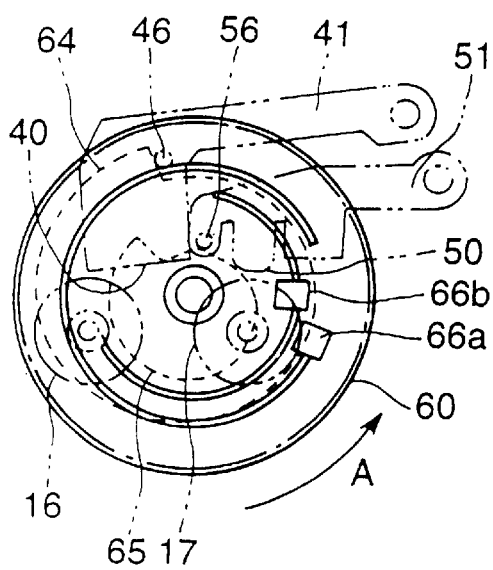
Figure 10:
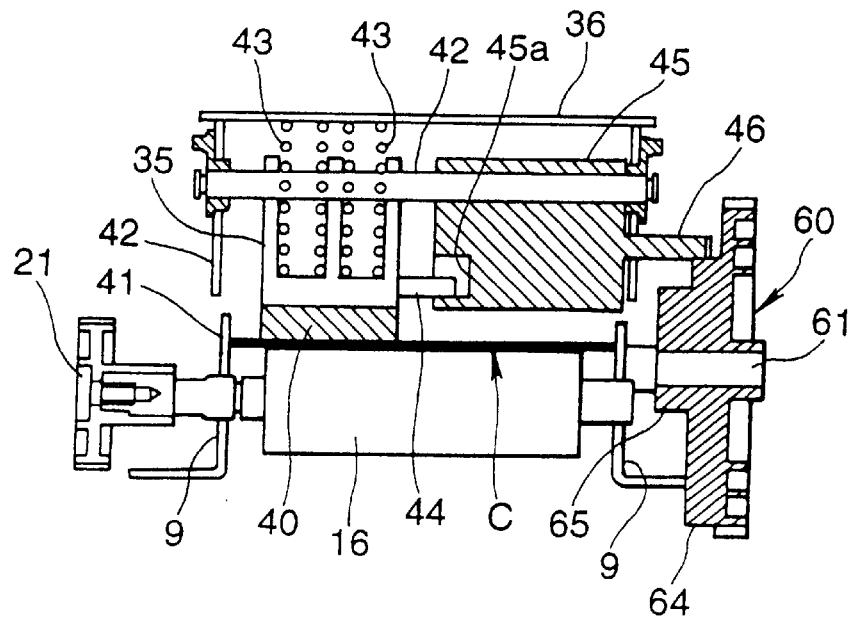
FIG. 10 is a view taken along line X—X of FIG. 16.

Next, when the cam gear 60 rotates to the direction taken at the arrow A and reaches the erasing/printing position, as shown in FIG. 9C, the cam pin 46 of the sub-arm 45 for the printing head 40 slips out the top end of the cam 64 for the printing head, so that the printing head 40 swings downward via arm 41 by the force of the compression spring 43 and thrusts the card C while the erasing head 50 maintains its condition. FIG. 10 shows the condition in which the printing head 40 thrusts the card C. Thus, the printing head 40 and the erasing head 50 thrust the card C at the erasing/printing position.

Figure 9D:
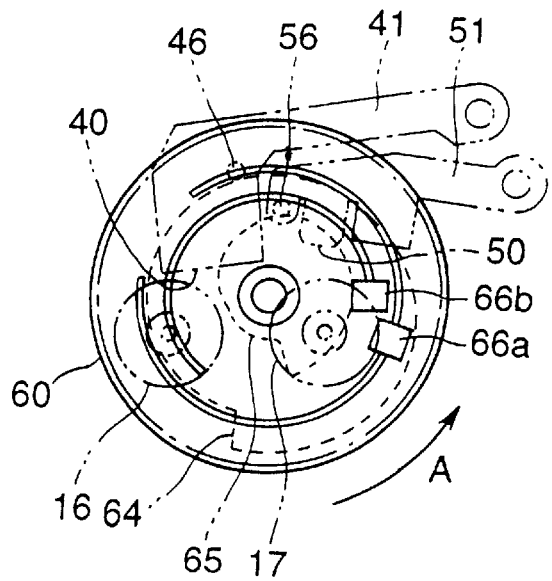

When the cam gear 60 further rotates to the direction taken at the arrow A and reaches the printing position, as shown in FIG. 9D, the cam 65 for the erasing head 50 thrusts up the sub-arm 55 and arm 51 via the cam pin 56 for the erasing head 50, so that only the erasing head 50 upwardly swings to separate from the card C while printing head 40 maintains its thrusting condition to the card C. Next, when the cam gear 60 further rotates to the direction taken at the arrow A, it returns to the standby position again, thereby restoring the condition shown in FIG. 9A.

As shown in FIG. 1, an ambient temperature sensor (temperature measuring device) 69 is provided below the card insertion opening 10. The ambient temperature sensor 69 senses the ambient temperature in a room in which the apparatus is provided. The ambient temperature sensor 69 is preferably located at a position where temperature elevation due to the apparatus itself will not be significant. When the ambient temperature sensor 69 is installed in the apparatus, an opening which opens to the outside of the apparatus is preferably provided in the vicinity thereof.

Figure 12:
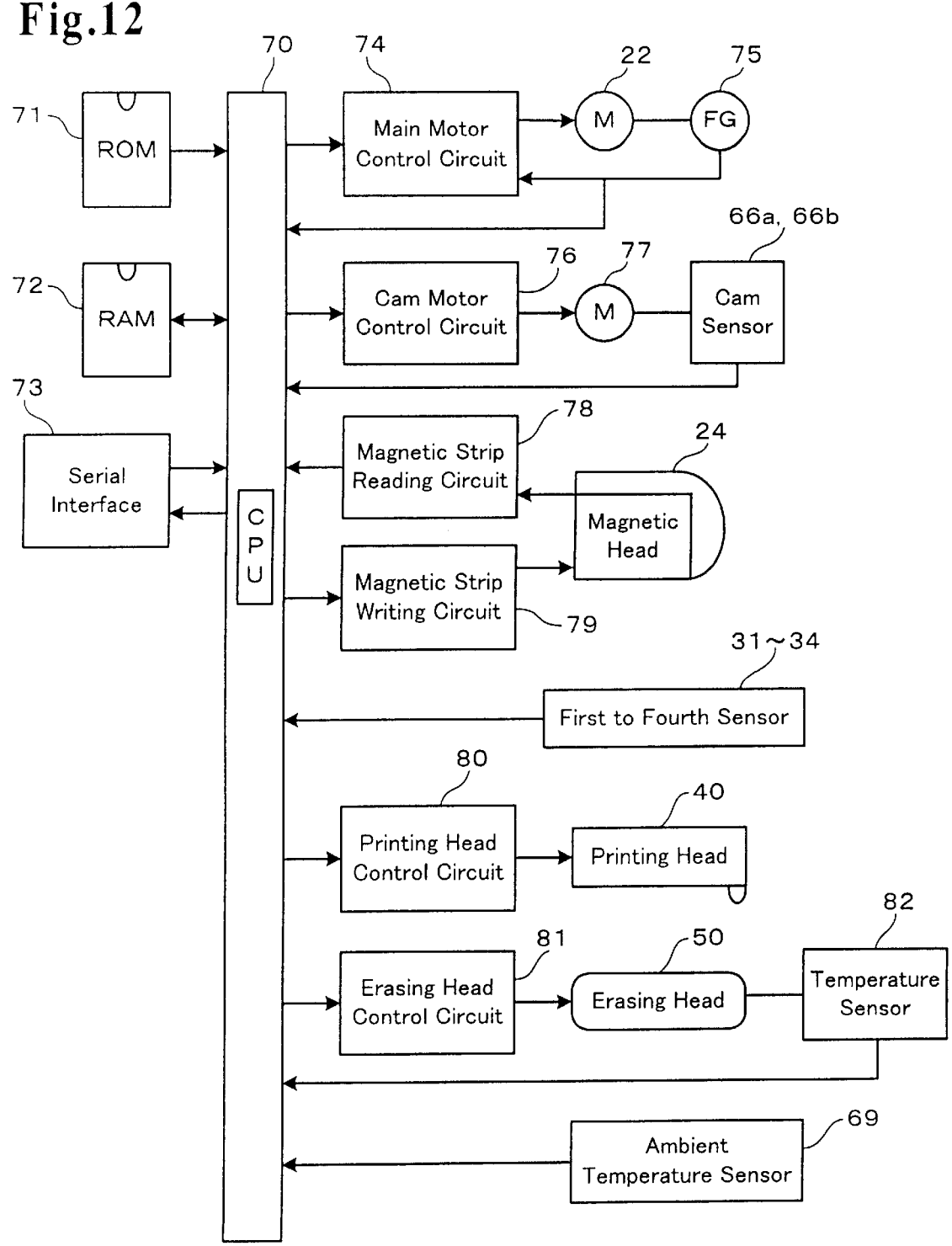
FIG. 12 is a control block diagram of a card processing apparatus according to an embodiment of the invention.

FIG. 12 shows a control block diagram for the above card processing apparatus. The CPU (control device) 70 is a microcontroller containing peripheral functions such as serial IO, parallel IO, timer, AD converter, and watchdog timer. The CPU 70 is connected to a ROM 71 recording a control program and permanent data so as to perform various kinds of controls. The CPU 70 is connected to a RAM 72 which can store printing data, command data, various kinds of set values, and standard data according to need, and to a serial interface 73 which receives erasing/printing commands from a prior piece of equipment and issues it to the CPU 70.

The first through fourth card sensors 31 to 34 output sensing signals to the CPU 70, and CPU 70 outputs control signals to a main motor control circuit 74 so as to control the movement of the main motor 22, such as rotation frequency, rotation direction, and starting/stop and the like. The main motor 22 is mounted with a FG (frequency generator) 75 so that the rotation frequency of the main motor 22 can be detected by measuring the pulse width of the pulse output by the FG 75. The CPU 70 outputs the starting/stop signal to the cam motor 77 (not shown in the previous figures) via cam motor control circuit 76 according to the output of the second through fourth card sensors 32 to 34 so as to control the cam gear 60 to the above-mentioned four positions. The magnetic head 24 is connected to a reading circuit 78 which reads the magnetic data written in the magnetic strip 3 of the card C, and writing circuit 79 which writes data to the magnetic strip 3. The CPU 70 performs reading/writing for magnetic data with respect to the magnetic strip 3 through the magnetic head 24 and the circuits 78 and 79 thereof.

The CPU 70 generates image (bit map) data and transfers the data to the printing head 40 through the printing head control circuit 80 while synchronizing the travel distance of the card C, so that a desired image is printed on the printing layer of the card C. Moreover, the CPU 70 heats the erasing head to a given erasing temperature through an erasing head control circuit 81. The erasing head 50 contains a temperature sensor 82 for sensing the temperature of the erasing head 50. The temperature of the erasing head 50 can be measured as a digital value by an A/D converter contained in the CPU 70. The CPU 70 calculates the data for the energizing time according to the detected temperature of the erasing head 50 and the set value data recorded in the ROM 71 or the RAM 72, and outputs an energizing pulse having a pulse width corresponding to the energizing time. Thus, the temperature of the erasing head 50 is controlled to a predetermined erasing temperature for making the heat-reversible material forming the printing layer 1 become transparent.

Signals detected from the ambient temperature sensor 69 are provided to the CPU 70. The detected signals are input to an A/D converter in the CPU 70 so as to convert them into digital values. The CPU 70 controls the erasing/printing processes and the energizing pulse width for the printing head 40 and the erasing head 50 according to values detected by the ambient temperature sensor 69.

(3) Movement of Card Processing Apparatus

Figure 13:
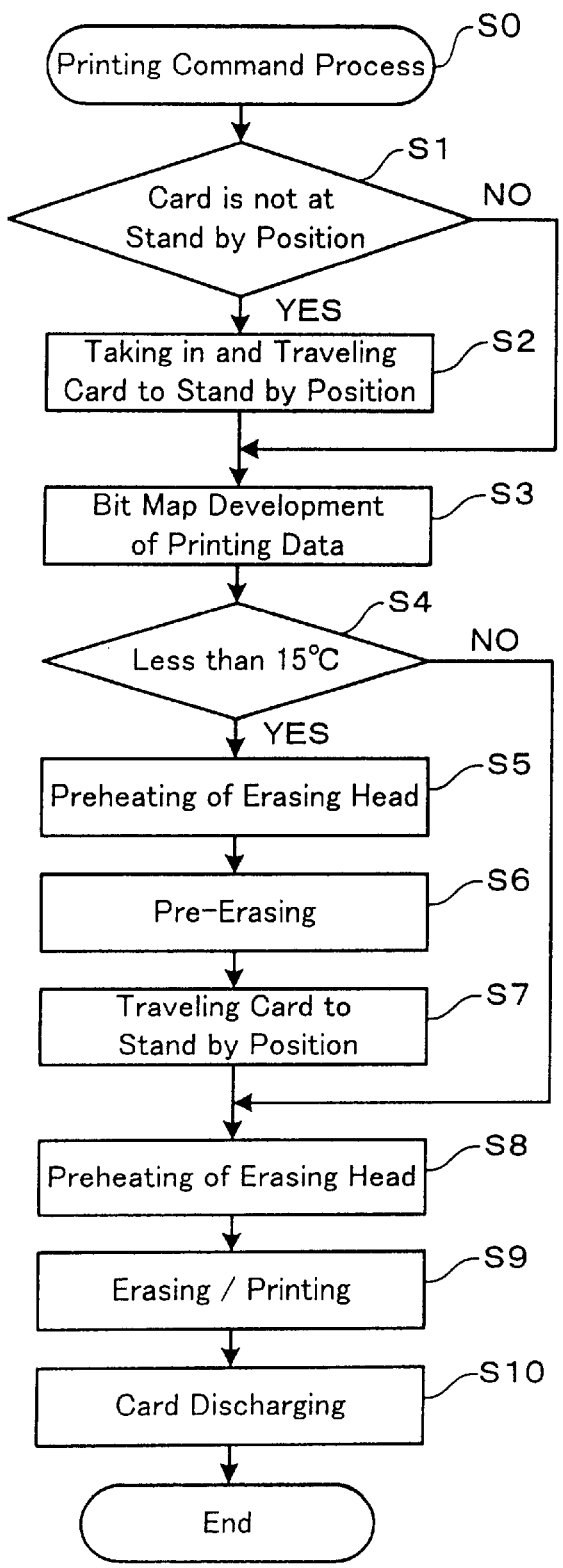
FIG. 13 is a flowchart showing functions of a card processing apparatus according to an embodiment of the invention.

Processes of erasing/printing of images to the printing layer 1 of the card C in the above card processing apparatus will be explained with reference to the flowchart in FIG. 13.

A. Preparing Step

When an erasing/printing command is issued to the CPU 70 through the serial interface 73 from preceding equipment (not shown), the CPU 70 calls a printing command processing subroutine S0 according to the program stored in the ROM 71. In the printing command subroutine S0, it is determined whether or not the card C is at standby at the standby position by receiving signals from the third and fourth card sensors 33 and 34 in step S1. When the determination is that the card C is at standby, the algorithm jumps to the step S3.

On the other hand, when the determination is that the card C is not at standby, the algorithm goes to the step S2, in which the first card sensor 31 waits for insertion of the card C. When the insertion of the card C is detected by the first card sensor 31, the CPU 70 rotates the main motor 22 through the main motor control circuit 74, thereby traveling the card C to the standby position at a high speed (for example 300 mm/s). FIG. 1 and FIG. 2 show the condition in which the card C is traveled to the standby position. In this condition, as shown in FIG. 1, FIG. 7, and FIG. 8, the printing head 40 and the erasing head 50 upwardly separate from the travel path 19 since the cam gear 60 is at the standby position. In the next step S3, the CPU 70 performs image (bit map) development on the row of characters designated by a printing command in the RAM 72. The algorithm goes to the step S4. In the step 4, the measured temperature by the ambient temperature sensor 69 and a reference temperature stored in the ROM 71 or the RAM are compared. When it is decided that the measured temperature is the reference temperature or more, the algorithm jumps to step S8. When it is decided that the measured temperature is lower than the reference temperature, the algorithm goes to step S5. The reference temperature is, for example, set to 15° C. according to a temperature in which whether or not erasing of images by the erasing head 50 is completed by one procedure.

In the step S5, preheating of the erasing head 50 is performed. For the preheating of the erasing head 50, the temperature TES detected by the temperature sensor 82 contained in the erasing head 50 and a preheating temperature set value TER stored in the ROM 71 or the RAM 72 is used. The preheating is performed by energizing according to the equation below when the duty value of the erasing head energizing pulse is defined as EPD.

$$EPD = (TER - TES) \times GAIN \text{(wherein the maximum value is 100\%)} \quad (A)$$

EPD is not decided by one calculation; instead, a feedback control is performed by repeated calculation each time the energizing period (for example 10 μs) elapses.

If the erasing head 50 is rapidly heated to the preheating temperature, large differences may occur between the actual surface temperature and the value detected by the temperature sensor 82 due to the time constant of the temperature sensor 82 contained in the erasing head 50 and the time it takes for heat conduction to the temperature sensor 82 from the heating element. Therefore, the erasing head 50 is preferably heated gradually. The GAIN in the equation (A) is preferably about 1 to 2.

B. Pre-Erasing

Figure 14:
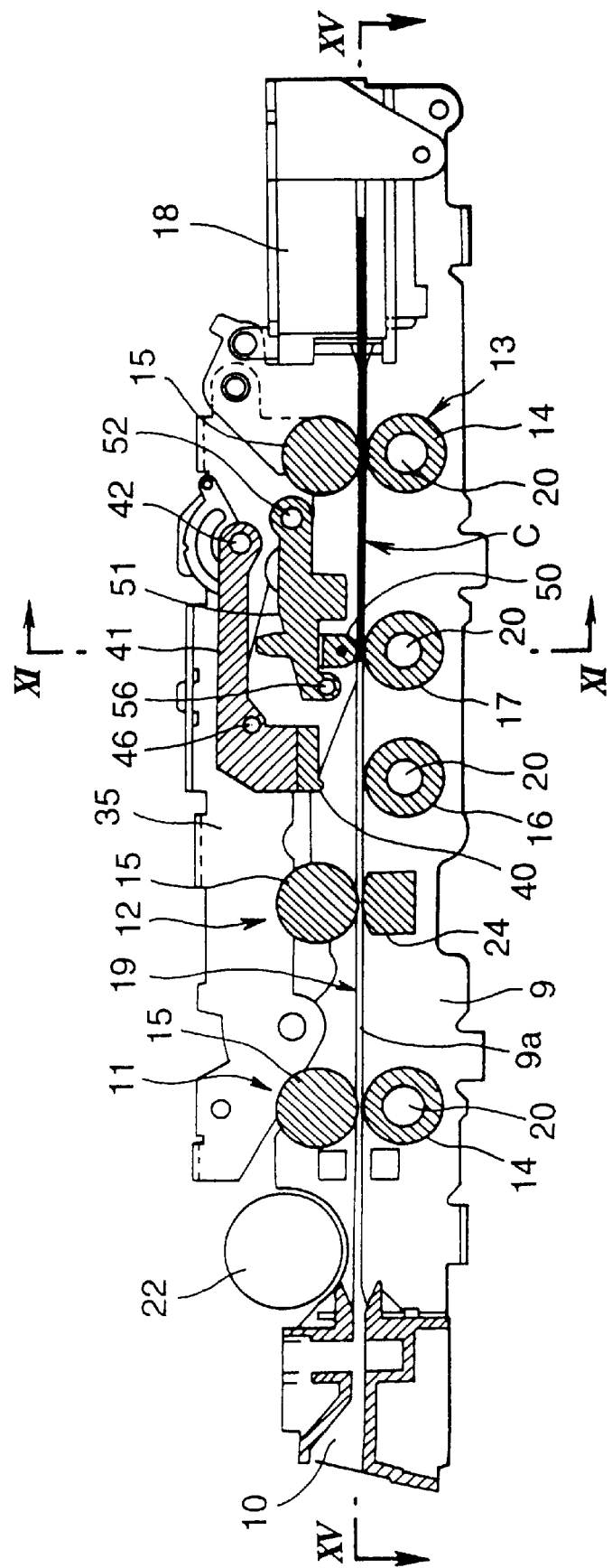
FIG. 14 is a right side view of a card processing apparatus according to an embodiment of the invention showing a condition of an erasing process.
Figure 15:
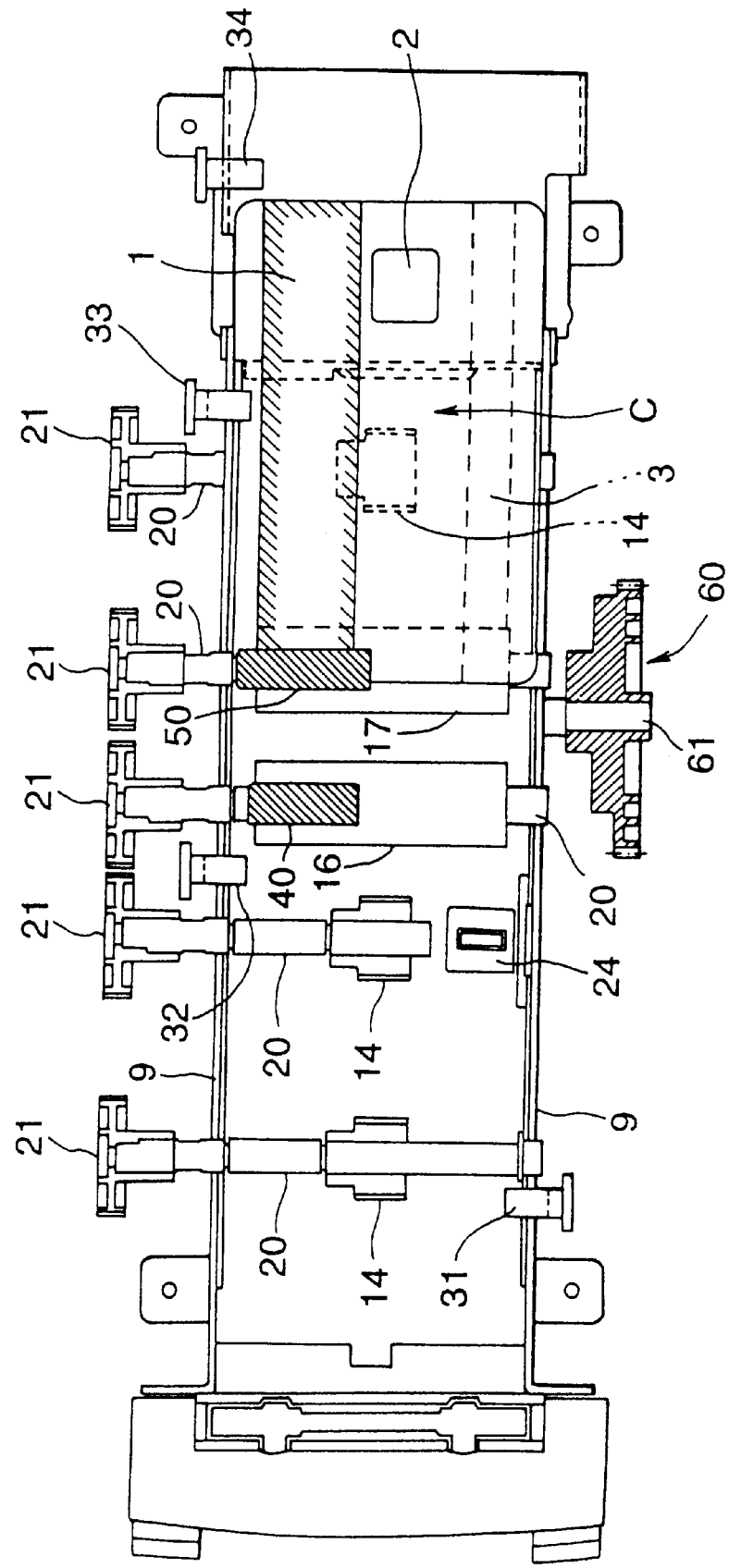
FIG. 15 is a view taken along line XV—XV.

When the preheating of the erasing head 50 is accomplished, the algorithm goes to step S6, in which erasing processing to the printing layer 1 of the card C is performed. In the erasing processing, the card C at the standby position is traveled forward while the travel distance is measured at a low travel speed. As shown in FIG. 14 and FIG. 15, when the front end of the card C reaches the position of the erasing head 50, the cam motor 77 is driven through the cam motor control circuit 76, so that the cam gear 60 rotates to the erasing position and the erasing head 50 thrusts the printing layer 1 of the card C. The printing layer 1 is heated to the given erasing temperature by the erasing head 50. The image on the printing layer 1 is continuously pre-erased since the card C is traveled forward.

When the erasing head 50 thrusts the printing layer 1 of the card C, the surface temperature of the erasing head 50 is lowered since heat thereof is absorbed by the card C, so that large differences may occur between the temperature measured by the temperature sensor 82 of the erasing head 50 and the actual temperature of the surface. Therefore, the energizing duty value EPD of the erasing head 50 is set according to the following equation.

$$EPD = K (K \text{ is less than } 100\%) \quad (B)$$

K is a value which is decided according to the electrical resistance of the heating elements in the erasing head 50, the ambient temperature, the travel distance from the start of erasing, the travel speed, and the characteristics of the material of the card C, etc., preferably in the range of 30 to 50% in actual use.

When the rear end of the card C reaches the position of the erasing head 50, energizing of the erasing head is stopped, and the cam gear 60 is rotated to the standby position so as to separate the erasing head by moving it upward, thereby completing the pre-erasing. In step S7, the main motor 22 is rotated in reverse so as to travel the card C to the standby position at a high speed. Then, the algorithm goes to the step S8, in which preheating of the erasing head is started as in the above procedure.

C. Erasing/Printing

1. Erasing Only

When the preheating of the erasing head 50 is accomplished, the algorithm goes to step S9, in which erasing (main erasing)/printing processing to the printing layer 1 of the card C is performed. In the erasing/printing processing, the card C at the standby position is traveled forward while the travel distance is measured at a low travel speed. As shown in FIG. 14 and FIG. 15, when the front end of the card C reaches the position of the erasing head 50, the cam motor 77 is driven through the cam motor control circuit 76, so that the cam gear 60 rotates to the erasing position and the erasing head 50 thrusts the printing layer 1 of the card C. The printing layer 1 is heated to the given erasing temperature by the erasing head 50. The image on the printing layer 1 is actually erased since the card C is continuously traveled forward.

2. Erasing/Printing

Figure 16:
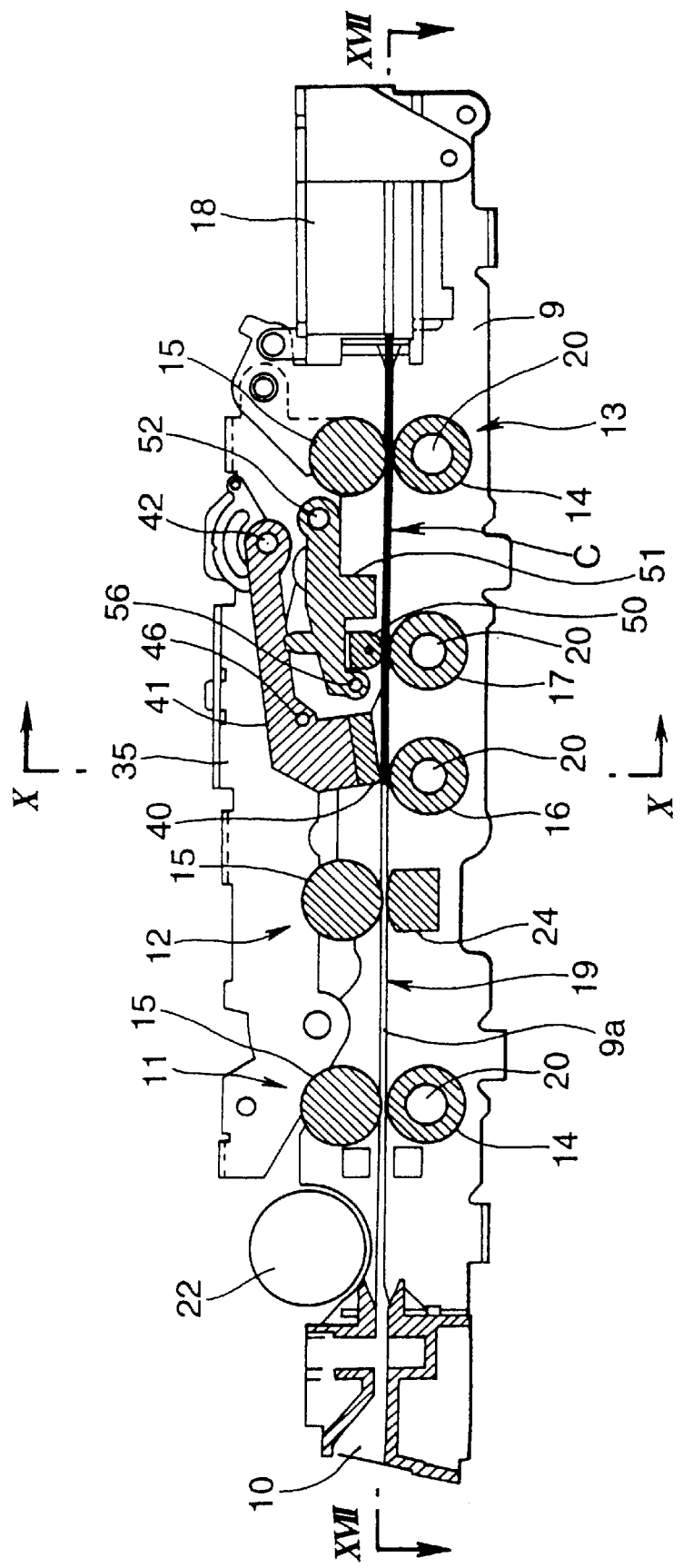
FIG. 16 is a right side view of a card processing apparatus according to an embodiment of the invention showing a condition of an erasing/printing processes.
Figure 17:
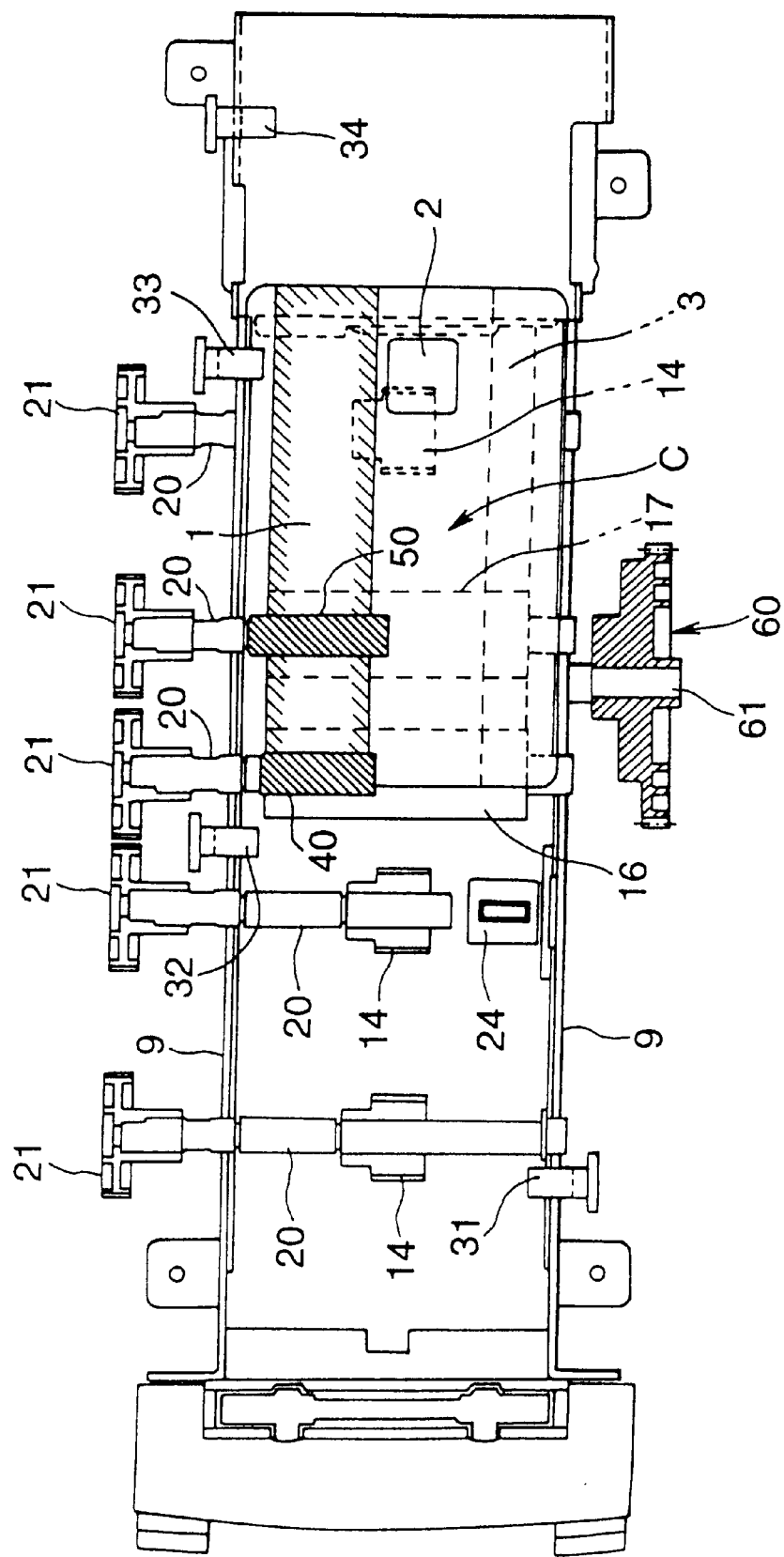
FIG. 17 is a view taken along line XVII—XVII.

As shown in FIG. 16 and FIG. 17, when the front end reaches the position of the printing head 40, the cam motor 77 is driven through the cam motor control circuit 76, so that the cam gear 60 rotates to the erasing/printing position to thrust the printing head 40 to the printing layer 1 where the image is erased. When the printing head 40 thrusts the printing layer 1, the printing data stored in the RAM 72 is transferred to the printing head 40 in order every time the card C is traveled by a predetermined amount (for example about 0.1 mm). When data corresponding to a line has been transferred to the printing head 40, a printing head energizing pulse, in which the pulse width is obtained by a timer contained in the CPU 70, is output to the printing head 40 through the printing head control circuit 80. Subsequently, the heating element of the printing head 40 is selctly energized based on the printing data, so that an image is thermally printed on the printing layer 1. Thus, according to the travel of the card C, image erasing by the erasing head 50 and new image printing by the printing head 40 are performed in parallel.

3. Printing Only

Figure 18:
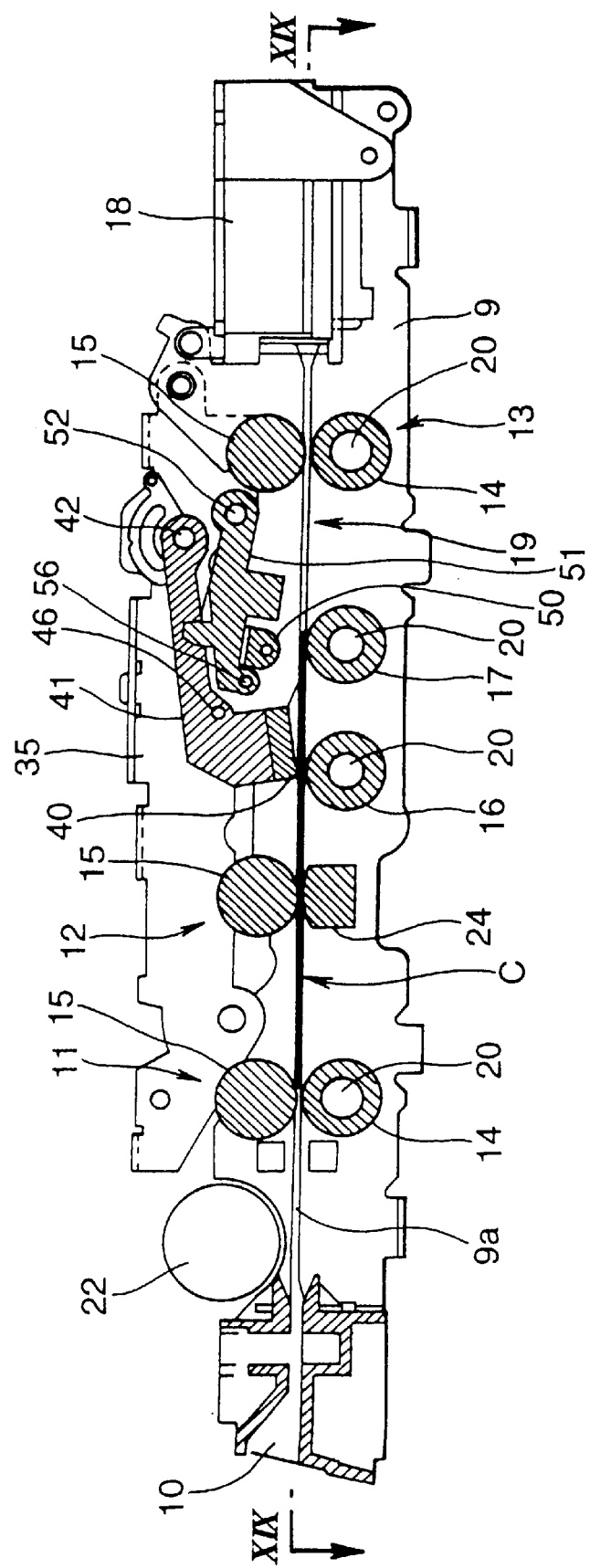
FIG. 18 is a right side view of a card processing apparatus according to an embodiment of the invention showing a condition of a printing process.
Figure 19:
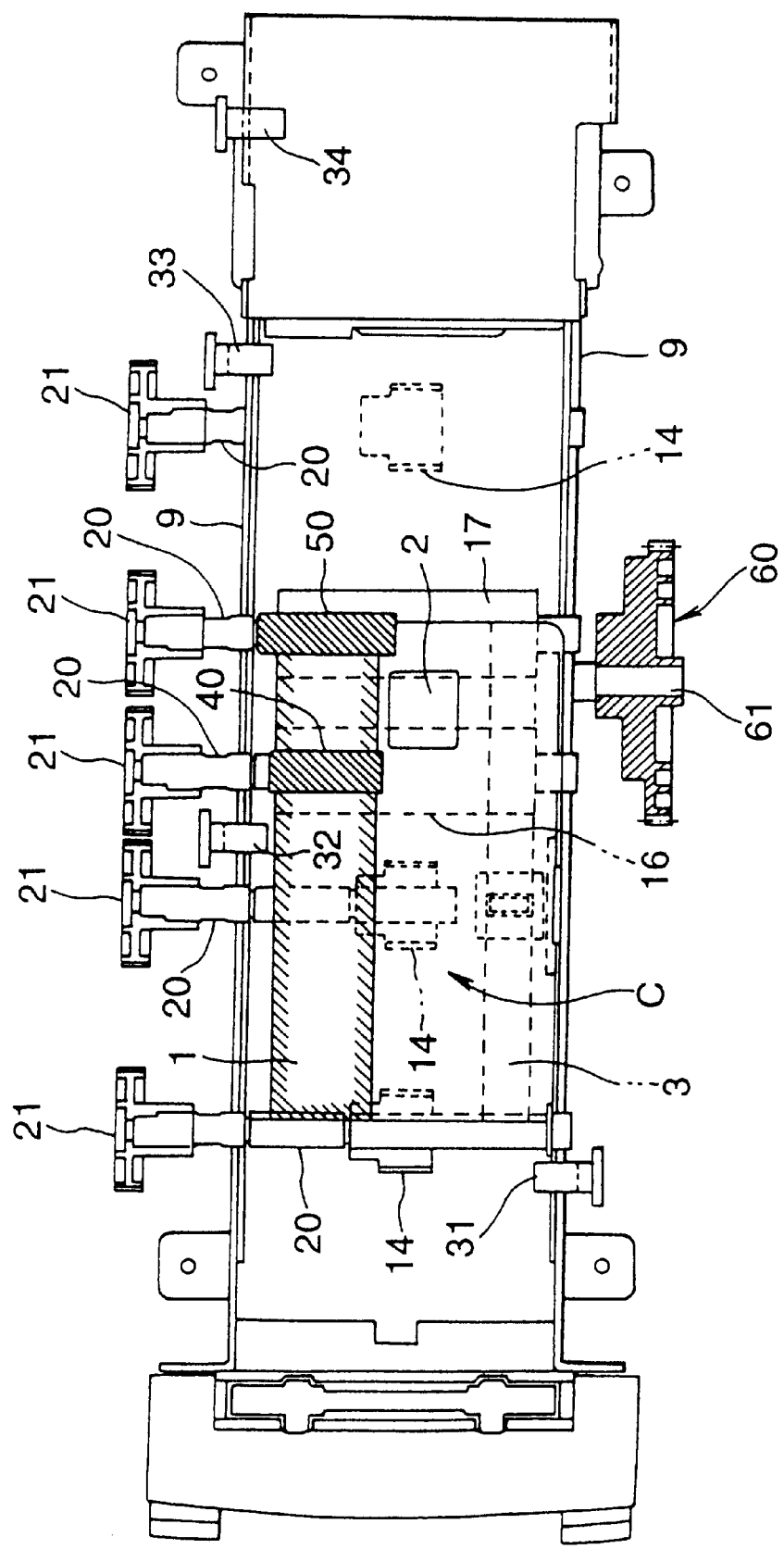
FIG. 19 is a view taken along line XIV—XIV.

Then, as shown in FIG. 18 and FIG. 19, when the rear end of the card C reaches the position of the erasing head 50, the cam motor 77 is driven through the cam motor control circuit 76, so that the cam gear 60 rotates to the printing position to separate the erasing head 50 from the printing layer 1, and only printing is performed hereinafter. When all the image data has been printed, the cam motor 77 is driven through the cam motor control circuit 76, so that the cam gear 60 returns to the standby position. Simultaneously, the printing head 40 and the erasing head 50 upwardly separate from the card C. Thus, the erasing/printing is accomplished and the algorithm goes to the card discharging in the step S6.

In the step S10, the card C is traveled to the front at a high speed until the front end of the card C passes through the second card sensor 32 and projects from the card insertion opening 10. Then, the main motor 22 stops.

(4) Functions and Effects of the Embodiment

According to the erasing/printing processes using the card processing apparatus of the embodiment, when the ambient temperature is lower than the reference temperature, pre-erasing is performed prior to main erasing; when the ambient temperature is not lower than the reference temperature, the main erasing process is performed once and the printing process is continuously performed. When the pre-erasing process is performed prior to the main erasing process at a low temperature, the printing layer is preheated so that the difference between the temperature of the erasing head 50 and that of the printing layer 1 is reduced. Therefore, the temperature of the entire surface of the printing layer 1 rapidly elevates to the erasing temperature in the subsequent main erasing process, so that images are securely erased even at low temperatures. Moreover, flexibility of the card is increased in the main erasing process so that erasing characteristics can be improved. Thus, the embodiment allows erasing over the entire surface of the printing layer and the enlarging of the effective area of the printing area. When the ambient temperature is not lower than the reference temperature, erasing error due to low temperature do not occur. Therefore, images are erased by one erasing process, and energy saving and shortening of processing time are improved.

In the main erasing process of the embodiment, the rate of increase of the temperature of the card C is relatively high due to the contact with the erasing head 50, and therefore the travel speed of the card C can be high and processing speed can be high.

It should be noted that the above card processing apparatus and method are one aspect of the invention, and the scope of the invention is not limited to the embodiment. For example, pre-erasing may be performed according to the temperature of the card instead of the ambient temperature. Moreover, both the card temperature and the ambient temperature may be measured, and pre-erasing may be performed according to both those temperatures.

In the embodiment, when the main erasing process after the pre-erasing process is performed, the card is returned to the standby position, then the erasing head performs the main erasing process. In the invention, the main erasing process and the printing process may be simultaneously performed by the printing head, using the heating function thereof after pre-erasing by the erasing head, while the card is continuously traveled. Furthermore, pre-erasing may always be performed, rather than being electively performed depending on the ambient temperature.

The invention is characterized in that the printing layer is heated prior to erasing process, and the above pre-erasing method is one embodiment of the invention. Therefore, the invention may be applied to numerous configurations. For example, the printing layer may be heated to a temperature higher or lower than the erasing temperature without consideration of the erasing of images, and heating may be performed by heating devices other than the erasing head.

As mentioned above, the invention is characterized in that the heating process is performed on a printing layer prior to an erasing process for erasing images on a rewritable card; images are securely erased even at low temperatures, so that erasing properties can be improved and the effective printing area can be enlarged.

What is claimed is:

1. A processing method for a rewritable card having a printing layer made of a heat-reversible recording material on which erasing/printing processes of images are repeatedly performed while traveling the rewritable card in a processing direction, the method comprising:

erasing images printed on the printing layer by an erasing head; and printing images on the printing layer by a printing head;

wherein heating of the printing layer is performed prior to the erasing.

2. A processing method for a rewritable card having a printing layer made of a heat-reversible recording material on which erasing/printing processes of images are repeatedly performed while traveling the rewritable card in a processing direction, the method comprising:

erasing images printed on the printing layer by an erasing head; and printing images on the printing layer by a printing head; and measuring at least one of the temperature of the rewritable card and the ambient temperature;

wherein heating is performed with respect to the printing layer prior to the erasing when the measured temperature is lower than a reference temperature.

3. A processing method for a rewritable card according to claim 2, wherein the reference temperature is in the range of 5 to 25° C.

4. A processing method for a rewritable card according to claim 2, wherein the reference temperature is in the range of 5 to 25° C.

5. A processing apparatus for a rewritable card having a printing layer made of a heat-reversible recording material on which erasing/printing processes of images are repeatedly performed by erasing images printed on the printing layer, and printing images on the printing layer while traveling the rewritable card, the apparatus comprising:

an erasing/printing device for performing erasing/printing processes with respect to the printing layer;

a heating device for performing a heating process with respect to the printing layer; and a control device for controlling the erasing/printing processes by the erasing/printing device and the heating process by the heating device;

wherein the control device controls the heating device to perform the heating process with respect to the printing layer prior to the erasing process.

6. A processing apparatus for a rewritable card having a printing layer made of a heat-reversible recording material on which erasing/printing processes of images are repeatedly performed by erasing images printed on the printing layer, and printing images on the printing layer while traveling the rewritable card in a processing direction, the apparatus comprising:

an erasing/printing device for performing erasing/printing processes with respect to the printing layer;

a heating device for performing a heating process with respect to the printing layer;

a temperature measuring device for measuring at least one of the temperature of the rewritable card and the ambient temperature; and a control device for controlling the erasing/printing processes by the erasing/printing device and the heating process by the heating device according to the temperature measured by the temperature measuring device;

wherein the control device controls the erasing device to perform a single erasing process when the measured temperature is a reference temperature or more, and controls the heating device to perform the heating process prior to the erasing process when the measured temperature is lower than the reference temperature.

7. A processing apparatus for a rewritable card according to claim 5, wherein the erasing/printing device comprises:

an erasing head for performing the erasing process;

a printing head for performing the printing process;

wherein the erasing head serves as the heating device.

8. An apparatus for processing a rewritable card on which erasing/printing processing of images repeatedly occur by printing and erasing images on a printing layer while traveling said rewritable card in a processing direction comprising:

an erasing/printing device comprising a printing head and an erasing head for printing and erasing a printing layer wherein said erasing head serves as a heating device;

a temperature measuring device for measuring at least one temperature of a rewritable card and ambient temperature; and a control device for controlling said erasing/printing device and said heating device by (1) controlling said erasing head to perform a heating process while traveling said rewritable card in said processing direction when said measured temperature is lower than said reference temperature; (2) traveling said rewritable card in a direction opposite to said processing direction after completing said heating process; (3) controlling said printing head to perform said printing process while traveling said rewritable card in said processing direction.

* * * * *